Figure 1:
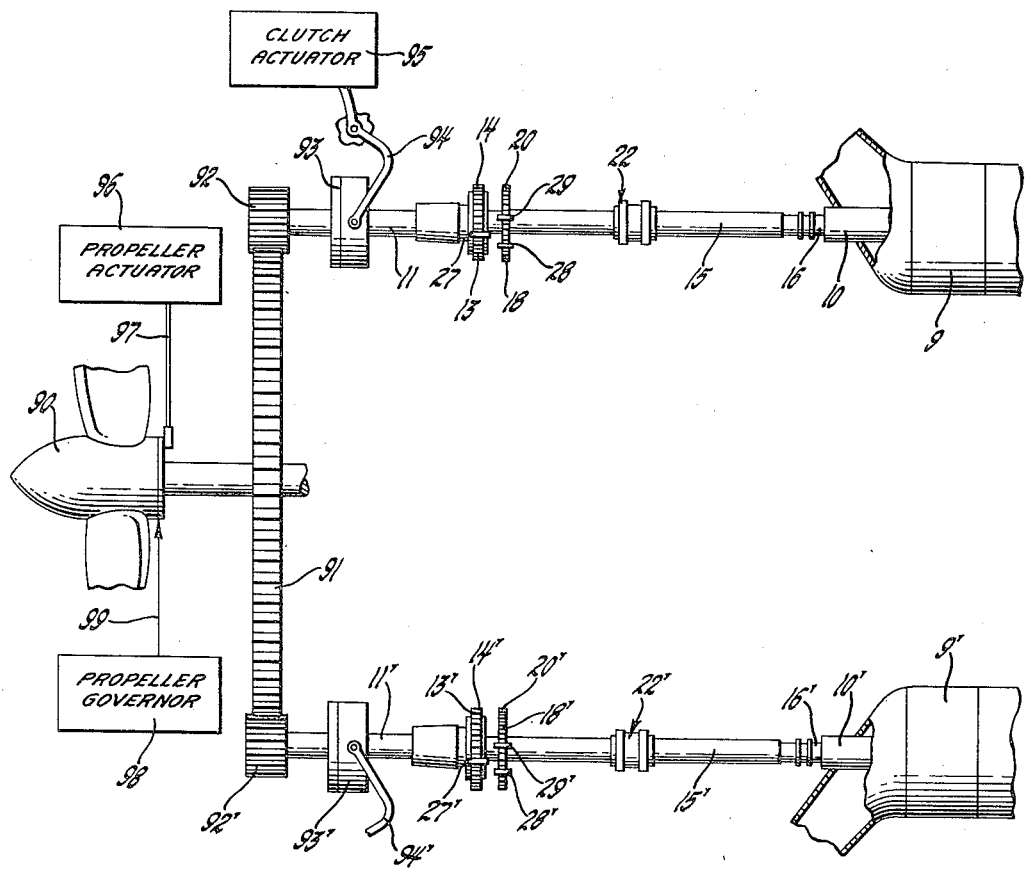

Oct. 16, 1956 R. D. TYLER ET AL 2,766,617
TORQUEMETER
Filed June 29, 1951 3 Sheets-Sheet 1

Inventors
Russell D. Tyler &
John M. Whitmore
By Willits, Helmig & Baillio
Attorneys

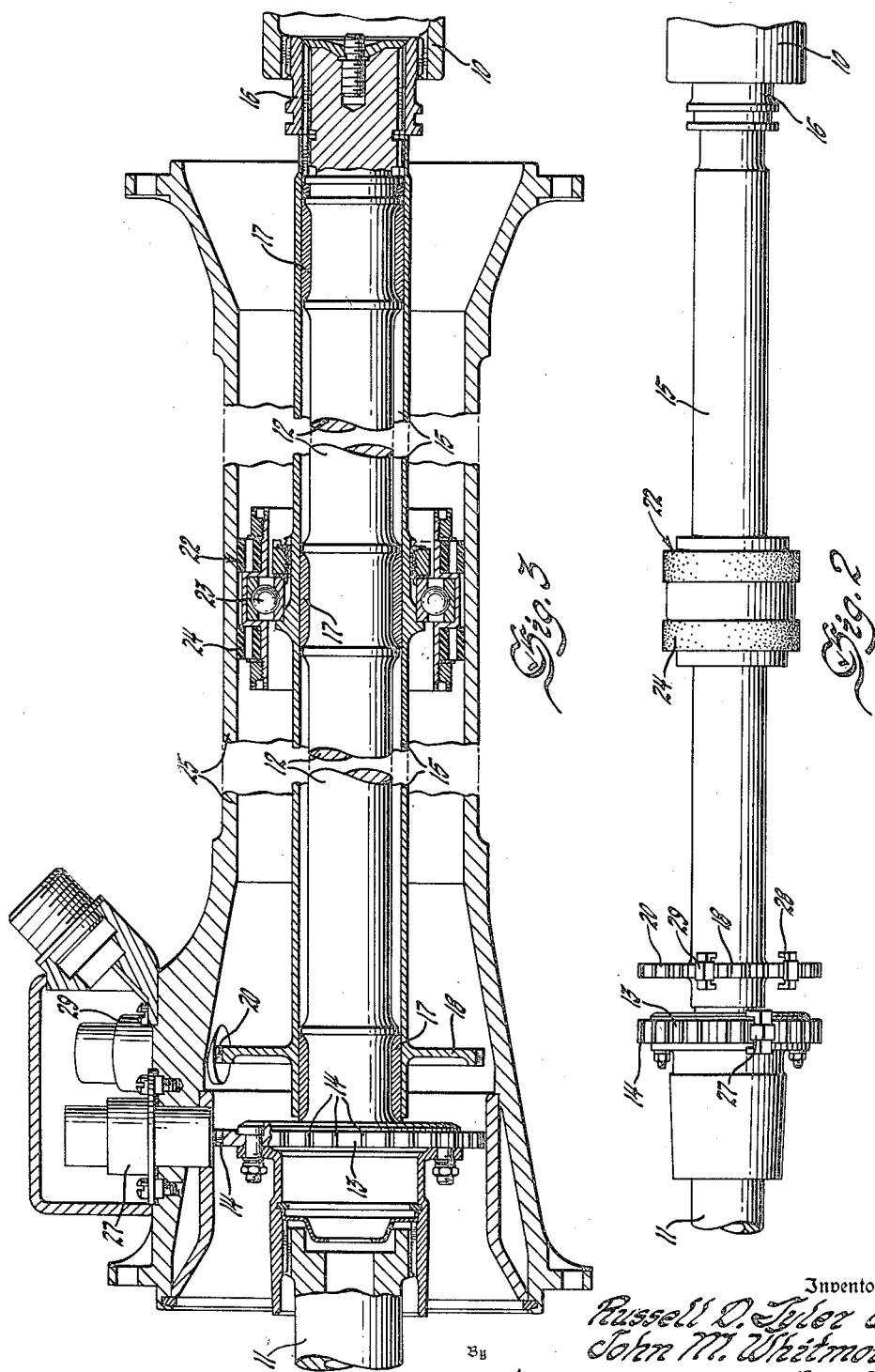

Oct. 16, 1956  R. D. TYLER ET AL  2,766,617
TORQUEMETER
Filed June 29, 1951  3 Sheets-Sheet 3
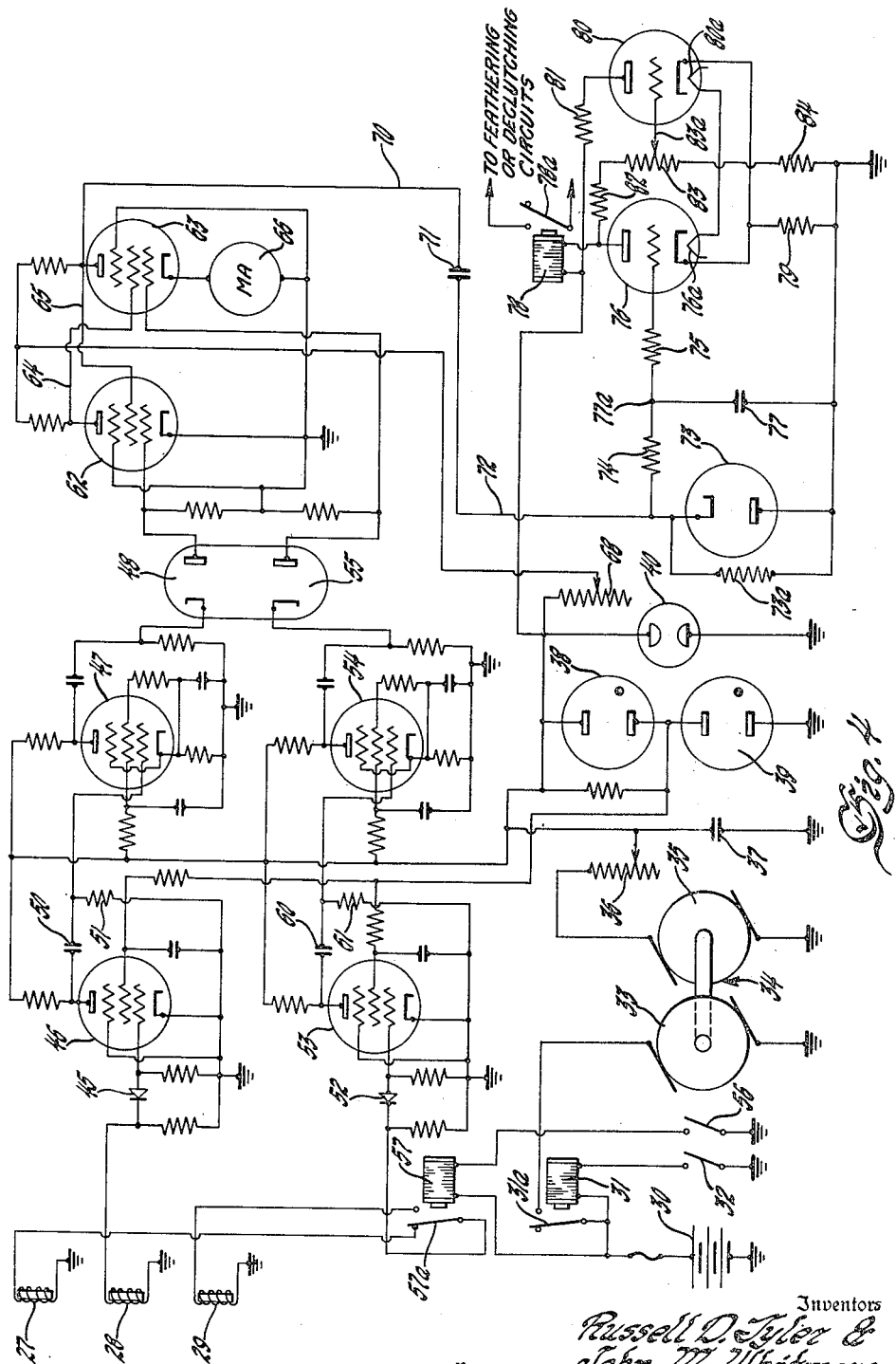

United States Patent Office 2,766,617
Patented Oct. 16, 1956

2,766,617

TORQUEMETER

Russell D. Tyler and John M. Whitmore, Indianapolis, Ind., assignors to General Motors Corporation, Detroit, Mich., a corporation of Delaware Application June 29, 1951, Serial No. 234,308

5 Claims. (Cl. 73—136)

This invention relates to a torquemeter, and more particularly to an electronic torquemeter and control means operated thereby.

One feature of the invention is that it provides an improved torquemeter; another feature of the invention is that it provides a torquemeter comprising torque transmitting means, means for developing torque and reference electrical signals differing in phase as a function of the amount of torque transmitted, and means for measuring said phase difference; a further feature of the invention is that it includes phase detecting means connected to the signal developing means for providing pulses which vary quantitatively as a function of the phase difference between the torque and reference signals; still another feature of the invention is that the phase detecting means includes an electronic switch operated by the torque and reference signals; yet a further feature of the invention is that it eliminates possibility of error due to misalignment of the torque developing means which include a rotatable torque shaft and a reference shaft coaxial therewith and rigidly connected thereto at one end and freely rotatable relative thereto at the other end; yet another feature of the invention is that said shafts are concentric and have pickup means associated therewith adjacent the free end of the reference shaft; still a further feature of the invention is that a vibration damper is mounted on the reference shaft to dampen vibrations at the resonance point of the shafts as the speed of rotation of the shafts varies between zero and operating speed; and an additional feature of the invention is that voltage pulses are provided having a time duration proportional to the phase difference between the torque and reference signals, and switch means operable by voltage pulses of a predetermined time duration are provided to give an indication of power failure.

Other features and advantages of the invention will be apparent from the following description and from the drawings, in which:

Fig. 1 is a schematic diagram of a dual power aircraft propulsion plant having the novel apparatus associated therewith; Fig. 2 is a side elevational view of the torque transmitting means associated with one of the engines of Fig. 1; Fig. 3 is an enlarged fragmentary longitudinal sectional view through the shafting of Fig. 1, portions being broken away; and Fig. 4 is a schematic diagram of the electronic circuits.

The novel torquemeter is particularly adapted for use in an aircraft, and according to the preferred embodiment of the invention torque transmitting means are provided comprising a rotatable torque shaft connecting power means (as an engine) to a load (as a propeller), this shaft being adapted to twist as a function of the amount of torque it transmits. A reference shaft is concentric with the torque shaft and is rigidly connected thereto at one end, as the power end, and freely rotatable relative thereto at the other end, as the load end. The concentric arrangement of the shafts is highly advantageous in that it eliminates any possibility of error due to misalignment of the shafts due to static or dynamic loading of the supporting frame. The torque shaft twists in a degree proportional to the amount of torque it transmits during operation, and electrical pickups are provided on both shafts adjacent the free end of the reference shaft for developing torque and reference electrical signals displaced in phase in a degree indicative of the rotative displacement between the torque and reference shafts at the pickup location. These signals are applied to a phase detecting circuit, and after being modified in shape are utilized to operate a multivibrator or flip-flop circuit to provide pulses of constant amplitude having a time duration proportional to the phase difference between the torque and reference signals. Current indicating means connected to the multivibrator provide an indication of the average current flow through one of the multivibrator tubes, this current flow being indicative of the amount of torque developed.

Impulses from the multivibrator may be utilized as a sensing device to operate switch means for any desired purpose, as, for example, to feather or de-clutch the propeller of the airplane in the event the torque developed by the engine drops below a predetermined level.

While the torquementer illustrated in the drawings is particularly adapted for use in an airplane engine and is illustrated as being incorporated therein, it will be understood that the invention is equally applicable to any torquemeter wherein it is desired to indicate the torque delivered by power means to a load.

Referring now more particularly to Figs. 1, 2 and 3, the reference character 9 designates power means, here illustrated as an airplane engine having a power output shaft 10, and reference character 90 designates a load, here illustrated as a propeller connected through gears 91 and 92 to a load input shaft 11. A clutch illustrated diagrammatically at 93 may be controlled through mechanical linkage 94 by a clutch actuator 95. The propeller may be feathered through a propeller actuator 96 which is coupled to the propeller through a mechanical linkage indicated at 97 and the operation of the propeller as a constant speed variable pitch propeller is directly controlled by an electric propeller governor 98 which transmits signals to a hydraulic mechanism in the propeller, which increases and decreases pitch, through an electrical circuit indicated at 99. The apparatus illustrated includes dual power plants, similar parts of the second power plant being designated by similar reference characters with a prime ('). For more details of the power plants reference may be had to the application of Irwin et al., entitled "Control System for Turbo-Prop Engines," filed November 8, 1950, as S. N. 194,716. A torque shaft 12 is coupled at one end to the engine output shaft 10, and is coupled at the other end to the load input shaft 11. Adjacent the propeller or load end of torque shaft 12 is a radial flange 13 having extending radially therefrom a plurality of equally spaced rectangular teeth or projections 14. A reference shaft 15 has a hub portion 16 at one end which is fixedly secured to the torque shaft 12 adjacent the engine end of the torque shaft, and the reference shaft 15 is freely rotatable relative to the torque shaft 12 at the other or load end. A plurality of bearings 17 are provided to insure coaxial rotation of the two shafts. The shaft 15 has a radial flange 18 adjacent its free end provided with a plurality of equally spaced rectangular radial projections or teeth 20. The flanges 13 and 18 are of the same diameter, and the teeth 14 and 20 are equal in number and preferably are located in pairs in alignment measured parallel to the axis of the shaft assembly.

When the torque shaft 12 is loaded, it will twist or "wind" in an amount proportional to the torque it transmits, while the shaft 15 (which transmits no torque other than that developed by its own inertia) will be displaced rotatably at its free end from its no-load angular or rotative relationship to the shaft 12, so that the exciter teeth 20 on the reference shaft 15 will be rotatably displaced from the exciter teeth 14 on the torque shaft 12 in an amount proportional to the torque transmitted by the torque shaft.

If the apparatus is used in a turbine type airplane engine as illustrated in Fig. 1, the operating speed of rotation may be between 11,500 and 14,300 revolutions per minute, and the natural resonance point of the shafting assembly will be below this frequency. In one embodiment of the invention the shafting assembly had a whip natural resonance point at 6,000 revolutions per minute. In order to dampen the vibrations encountered when passing through the whip natural resonance point during starting and stopping, a vibration damper, designated generally at 22, is provided. This damper comprises a bearing 23, located substantially at the midpoint of the shaft assembly and carried in a bearing race mounted between the shaft 15 and a neoprene damper 24 which is secured to a dust tube 25 (Fig. 3) which encompasses the shafting assembly.

Electrical signals indicative of the rotative position of the load end of the torque shaft 12, and hereinafter referred to as "torque signals," are developed by pickup means comprising the spaced teeth 14 on the torque shaft and a magnetic pickup member 27 mounted closely adjacent the path of movement of the projections 14.

Electrical signals indicative of the rotative position of the load end of the reference shaft 15, and hereinafter referred to as "reference signals," are developed by pickup means comprising the spaced teeth 20 on the reference shaft and a magnetic pickup member 28 mounted closely adjacent the path of movement of the projections 20.

One pickup member is displaced a few degrees with respect to the other around the circumference of the shafting assembly, but, as pointed out above, the teeth on the respective shafts are in line under no-load conditions. As the shafts are rotated electrical signal impulses are produced each time one of the teeth passes closely adjacent its respective pickup member. Since the pickups are circumferentially displaced, the torque signals and reference signals will be out of phase a few degrees under zero load conditions. As the torque shaft "winds," as it will when load is applied, the teeth on the torque shaft are displaced further with respect to the teeth on the reference shaft in an amount proportional to the torque transmitted. This further displacement causes an increase in the phase difference between the torque and reference signals.

For calibration purposes a third pickup 29 is mounted radially over the reference exciter teeth 20. This pickup is located a fixed distance from the reference pickup 28 around the circumference of the reference shaft to provide a constant phase difference between the reference signals and the signals developed by the calibration pickup. This fixed phase difference may be considered as simulated torque in the calibration of the electronic circuit.

The electronic circuit for the torquemeter is shown schematically in Fig. 4, the purpose of the circuit being to convert the electrical signals to steep-sided voltage pulses which are used to trigger a multivibrator circuit, one tube of which passes current in a quantity indicative of the phase difference between the torque and reference signals. This phase difference is indicative of the amount of torque transmited by the torque shaft.

Referring to Fig. 4, the circuit shown may be powered from a conventional battery 30, which may be the battery of the airplane. One terminal of the battery is connected to ground and other terminal is connected through the coil 31 of a relay to one contact of an On-Off switch 32, the other contact of which is grounded. When the switch 32 is manually closed the relay contacts are closed and to battery 30 is connected through the relay armature 31a to the motor element 33 of a motor-generator designated generally at 34 and having a generator element 35 for developing a high D. C. voltage for energizing the tubes of the electronic circuit. This voltage may be adjusted in magnitude by means of a variable resistor 36, and is filtered and regulated by a filter condenser 37 and a regulatory system comprising voltage regulating tubes 38 and 39. A neon lamp 40 is connected between the high voltage lead and ground to provide a pilot light.

The reference signals developed by the pickup member 28 (schematically shown in Fig. 4) are converted into steep-sided negative voltage impulses in a circuit including a rectifier 45 and tubes 46, 47 and 48. The signal from the pickup member 28 is rectified by the rectifier 45 and applied to the signal grid of the tube 46 which may be a pentode of tube type No. 12AU6. The resulting impulse in the anode circuit of the tube 46 is differentiated by a circuit including a condenser 50 which may have a value of 10 micromicrofarads and a resistor 51 which may have a value of 20,000 ohms, and the differentiated pips are applied to the input grid of the tube 47 which may be a pentode of tube type 12AU6. The pips are clipped by the tube 47, and the resulting steep-sided negative impulses in the anode circuit are passed through the diode 48 which may comprise one section of a dual tube of type No. 12AL5.

The torque signals developed by the pickup member 29 are converted into steep-sided negative impulses in a similar circuit including a rectifier 52 and tubes 53, 54 and 55. In order to select the torque signals or the calibration signals as desired, a manually operable calibration switch 56 is provided. One contact of this switch is connected to ground and other contact is connected to the battery 30 through a relay coil 57. The armature 57a of the relay comprises the movable pole of a single pole double throw switch, the armature or movable pole being connected to the rectifier 52 and the stationary contacts being connected respectively to the pickup members 27 and 29. When the calibration switch 56 is open as illustrated, the torque pickup member 27 is connected in the circuit. When the calibration switch 56 is closed the relay is energized, disconnecting the pickup member 27 and connecting the calibration pickup member 29 into the circuit. With the calibration switch open as illustrated the torque signals are amplified in the tube 53, differentiated in a circuit comprising a condenser 60 and a resistor 61, the differentiated pulses are clipped in the tube 54, and the resulting negative steep-sided voltage impulses are passed through the rectifier 55 which may comprise the other section of the above mentioned 12AL5 type tube.

The multivibrator or flip-flop circuit comprises a normally conducting tube 62 and a normally cut-off tube 63, the respective anodes and screen grids of these tubes being interconnected by means of leads 64 and 65. In the normal condition of the circuit, tube 62 is conducting and the anode voltage of this tube (and hence the screen voltage of tube 63) will be relatively low. This low voltage holds tube 63 cut off.

When the steep-sided negative reference impulse is applied to the control grid of tube 62 this tube is instantaneously cut off, raising the anode voltage of tube 62 and the screen grid voltage of tube 63, so that tube 63 now becomes conductive and current flows through a milliammeter 66 which is connected in the cathode circuit of tube 63. Tube 63 passes a constant current dependent upon the tube characteristics and the applied voltages. Tube 63 remains conductive during the phase difference period between the reference and torque impulses. Upon the occurrence of the succeeding negative torque impulse (which impulse is delayed in phase because of the positioning of the pickup member 27 and because of the wind-up or twist of torque shaft 12 under load) tube 63 is cut off. At the instant tube 63 is cut off its anode voltage, and the screen grid voltage of tube 62 become more positive so that tube 62 again conducts, and its lowered anode voltage now holds tube 63 in cut off condition.

Consequently, it will be seen that the above described phase detecting circuit provides current pulses which vary quantitatively as a function of a phase difference between the reference and torque signals, and the current measuring meter in the cathode circuit of the tube 63 provides an average indication of the amount of current flowing through tube 63. This meter may be calibrated directly in terms of torque.

Obviously, the accuracy of the indication depends upon the constant current characteristics of tube 63, and if the amplitude of the current flowing through the tube varies, the reading will be inaccurate. In order to check the accuracy of the indication it is merely necessary to close the calibration switch 56, disconnecting the torque signals and connecting the calibration signals into the circuit. Inasmuch as the reference and calibration signals are both developed from the reference shaft 15, these signals maintain a predetermined phase difference. With the calibration signals connected into the circuit a variable resistor 68 may be adjusted to vary the anode and screen voltages on the tubes 62 and 63 to provide proper calibration.

It is desirable to feather or de-clutch the propeller of an airplane engine as soon as possible after the engine ceases to deliver power in order to eliminate quickly the drag caused by rotating the propeller and engine by air force. By using the torquemeter as a sensing device, it is possible to feather or de-clutch the propeller automatically when the engine torque falls below any predetermined point.

A circuit for accomplishing automatic feathering or de-clutching is shown in Fig. 4. A lead 70 is connected between the anode of tube 63 and a condenser 71, the other terminal of the condenser being connected by means of a lead 72 to the cathode of a diode 73. A resistor 73a is connected across the diode, a pair of resistors 74 and 75 are connected in series between the diode cathode and the grid of a triode 76, and a condenser 77 is connected from a point 77a between the resistors 74 and 75 to the anode of the diode 73 and to ground. The anode of the triode 76 is connected to the B-plus supply through the coil 78 of a relay, and the cathode of said triode is connected to ground through a resistor 79. Another triode 80 has its cathode connected to ground in a common circuit through said resistor 79, and its anode connected to the B-plus supply through a resistor 81. A resistor 82, a potentiometer 83 and a resistor 84 are connected in series between the anode of tube 76 and ground, and the movable tap 83a of the potentiometer 83 is connected to the control grid of the tube 80. The armature 78a of the relay forms a normally open switch which may be in the circuit controlling the feathering or de-clutching relay for the aircraft propeller as disclosed, for example, in application S. N. 194,716.

The operation of the automatic feathering or de-clutching circuit is as follows: During each conductive interval of tube 63 the anode voltage of said tube will be in the form of a negative pulse having a time duration proportional to the phase difference between the reference and torque signals and indicative of the amount of torque developed by the engine. This negative voltage impulse is passed through the condenser 71, and the diode 73 and resistor 73a which is connected thereacross to provide a clamping or D. C. restoring action circuit to maintain the zero voltage axis at the peak of the negative square wave impulse. Resistor 74 and condenser 77 function as an integrating circuit to modify the voltage at point 77a to the average of the square wave voltage. In other words, the voltage level at point 77a is an inverse linear function of the torque transmitted by the torque shaft 12, i. e., said voltage becoming more negative as the torque increases and said voltage becoming less negative as the torque decreases.

This voltage is utilized to control the operation of switch 78a. A cathode voltage for tubes 76 and 80 is developed across resistor 79 by the flow of current through said tubes, and this voltage provides a bias voltage for the tubes. Current flowing from the anode of tube 76 through resistors 82, 83 and 84 to ground also develops a voltage at the grid of tube 80.

The circuit is so designed that above a predetermined percentage of rated engine power the voltage at point 77a is more negative than the cathode voltage of tube 76, and tube 76 is therefore cut off. Under these conditions the anode of tube 76 is at a high potential and the movable tap 83a of the potentiometer 83 is adjusted to provide a grid voltage that is more positive than the common cathode voltage of tubes 76 and 80. Tube 80 thus conducts, and current flowing through this tube maintains the cathode voltage of tube 76 at a proper value to hold tube 76 cut off, so that the relay in the anode circuit of tube 76 is de-energized and the relay switch is open. The circuit remains in this stable condition as long as the voltage at point 77a is more negative than the cathode voltage of tube 76. In the event engine power is reduced the torque transmitted by shaft 12 decreases and the phase angle between the torque and reference signals decreases, and the time duration of the negative pulses taken from the anode of tube 63 becomes shorter so that the integrated value of these pulses, i. e., the negative voltage at point 77a becomes less negative. The circuit is so designed that at a predetermined percentage of rated engine power the voltage at point 77a becomes insufficient to hold tube 76 cut off. When tube 76 begins to conduct, its lowered anode voltage causes less voltage drop across series resistors 82, 83 and 84, lowering the grid voltage of tube 80 to cut tube 80 off. Cathode voltage for tubes 76 and 80 is then maintained by the current flowing through tube 76. Space current through tube 76 causes energization of relay coil 78 with consequent closure of armature 78a, closing the circuit to the automatic feathering or de-clutching relay in the propeller control circuit so that the propeller is automatically feathered or de-clutched.

The circuit includes several safety features. First, if for any reason the multivibrator circuit fails to function properly condenser 71 will block the D. C. anode voltage of tube 63 and the grid voltage of tube 76 will return to zero, leaving tube 76 cut off and the automatic feathering circuit open. Secondly, the respective filaments 76a and 80a of tubes 76 and 80 are connected in series so that if either filament burns out the other tube will not conduct, thus leaving the automatic feathering circuit open. As a third safety feature, if B-plus fails for any reason tube 76 will not conduct current, leaving the automatic circuit open.

In the event of engine failure in a turbo prop aircraft engine, the propeller would drive the engine, developing substantial negative torque and creating a very undesirable drag on the aircraft. In the event of power failure during a take-off it is important that the propeller be feathered (in a multi-engine aircraft) or de-clutched (in a single engine aircraft) as soon as possible. The circuit above described may be so arranged that it will operate to close relay contacts 78a in the event engine power falls below about 55 percent of rated value during take-offs, and means may be provided for disabling this switching circuit in the event the engine is throttled down prior to landing. If desired the circuit may be so arranged that the relay contacts 78a will be closed in the event power falls near zero, or even in the event negative torque is developed, in order to feather or de-clutch the propeller at all times when the engine fails or is throttled down.

While we have shown and described one embodiment of our invention, it is subject to many modifications. Changes, therefore, in the construction and arrangement may be made without departing from the spirit and scope of the invention as set forth in the appended claims.

What is claimed is:

1. A torquemeter of the character described for indicating the torque delivered by power means to a load, including: a rotatable torque shaft connecting the power means to the load, said shaft being adapted to twist as a function of the amount of torque it transmits; a reference shaft coaxial with said torque shaft and rigidly connected thereto at one end and freely rotatable relative thereto at the other end; a plurality of antifriction bearings mounted between said shafts at spaced positions intermediate the ends thereof; a resilient vibration damper mounted on said reference shaft near the midpoint thereof and adjacent at least one of said bearings; pickup means for providing torque and reference signals displaced in phase in a degree indicative of the rotative displacement between said shafts adjacent the free end of the reference shaft; means for converting said signals into steep-sided voltage impulses; phase detecting means connected to said last mentioned means for providing pulses which vary quantitatively as a function of the phase difference between said torque and reference signals, said phase detecting means including an electronic switch operated by said impulses; and a current measuring meter connected to said electronic switch for providing an indication of the amount of torque transmitted.

2. A torquemeter of the character described for indicating the torque delivered by an engine to a load, including: an inner rotatable torque shaft connecting the engine to the load, said shaft being adapted to twist in proportion to the amount of torque it transmits; an outer reference shaft concentric with said torque shaft and rigidly connected thereto at one end and freely rotatable relatively thereto at the other end, said shafts being generally of the same length; a plurality of antifriction bearings mounted between said shafts at spaced positions intermediate the ends thereof; a resilient vibration damper mounted on said reference shaft near the midpoint thereof and adjacent at least one of said bearings; first pickup means comprising a plurality of equally spaced radial projections extending from said reference shaft adjacent the free end thereof and a pickup member mounted closely adjacent the path of movement of said projections; and second pickup means comprising a like number of equally spaced radial projections extending from said torque shaft adjacent the free end of said reference shaft and a pickup member mounted closely adjacent the path of movement of said last mentioned projections, said first and second pickup means providing reference and torque signals displaced in phase in a degree indicative of the rotative displacement between said shafts adjacent the free end of said reference shaft; phase detecting means connected to said pickup means for providing pulses which vary quantitatively as a function of the phase difference between said torque and reference signals; and indicating means connected to said phase detecting means for providing an indication of the amount of torque transmitted.

3. A torquemeter of the character described for indicating the torque delivered by an engine to a load, including: an inner rotatable torque shaft connecting the engine to the load, said shaft being adapted to twist in proportion to the amount of torque it transmits; an outer reference shaft concentric with said torque shaft and rigidly connected thereto at one end and freely rotatable relative thereto at the other end, said shafts being generally of the same length; a plurality of antifriction bearings mounted between said shafts at spaced positions intermediate the ends thereof; a resilient vibration damper mounted on said reference shaft near the midpoint thereof and adjacent at least one of said bearings; first pickup means comprising a plurality of equally spaced radial projections extending from said reference shaft adjacent the free end thereof and a pickup member mounted closely adjacent the path of movement of said projections; and second pickup means comprising a like number of equally spaced radial projections extending from said torque shaft adjacent the free end of said reference shaft and a pickup member mounted closely adjacent the path of movement of said last mentioned projections, said first and second pickup means providing reference and torque signals displaced in phase in a degree indicative of the rotative displacement between said shafts adjacent the free end of said reference shaft; means for converting said torque signals into steep-sided negative voltage impulses; a multivibrator having a first normally conducting tube and a second normally cut off tube; a circuit connecting said reference impulses to the input of said first tube to cut off said first tube and render said second tube conductive; a circuit connecting said torque impulses to the input of said second tube to cut off said second tube and render said first tube conductive; and current indicating means connected in circuit with said second tube for providing an indication of the average current passed by said second tube.

4. In a torquemeter having means for indicating the torque delivered by an engine to a load, apparatus of the character described, including: a rotatable torque shaft connecting the engine to the load, said shaft being adapted to twist as a function of the torque it transmits; a reference shaft coaxial with said torque shaft and rigidly connected thereto at one end and freely rotatable relative thereto at the other end; a plurality of antifriction bearings mounted between said shafts at spaced positions intermediate the ends thereof; a resilient vibration damper mounted on said reference shaft near the midpoint thereof and adjacent at least one of said bearings; first pickup means having a portion on said reference shaft adjacent the free end thereof; and second pickup means having a portion on said torque shaft adjacent the free end of said reference shaft, said first and second pickup means providing signals displaced in phase in a degree indicative of the rotative displacement betweeen said shafts adjacent the free end of said reference shaft.

5. In a torquemeter having means for indicating the torque delivered by an engine to a load, apparatus of the character described, including: an inner rotatable torque shaft connecting the engine to the load, said shaft being adapted to twist in proportion to the amount of torque it transmits; an outer reference shaft concentric with said torque shaft and rigidly connected thereto at one end and freely rotatable relative thereto at the other end, said shafts being generally of the same length; a plurality of anti-friction bearings mounted between said shafts at spaced positions intermediate the ends thereof; a resilient vibration damper mounted on said reference shaft near the midpoint thereof and adjacent at least one of said bearings; first pickup means comprising a plurality of equally spaced radial projections extending from said reference shaft adjacent the free end thereof, and a pickup member mounted closely adjacent the path of movement of said projections; and second pickup means comprising a like number of equally spaced radial projections extending from said torque shaft adjacent the free end of said reference shaft and a pickup member mounted closely adjacent the path of movement of said last mentioned projections, said first and second pickup means providing signals displaced in phase in a degree indicative of the rotative displacement between said shafts adjacent the free end of said reference shaft.

References Cited in the file of this patent

UNITED STATES PATENTS

| | | |
|---|---|---|
| 2,050,866 | Tamm | Aug. 11, 1936 |
| 2,279,301 | Colley et al. | Apr. 14, 1942 |
| 2,302,496 | Gasser | Nov. 17, 1942 |
| 2,317,202 | Kohlhagen | Apr. 20, 1943 |
| 2,349,663 | Langer | May 23, 1944 |
| 2,474,144 | Forsyth | June 21, 1949 |
| 2,564,484 | Kuehni | Aug. 14, 1951 |
| 2,586,540 | Holden | Feb. 19, 1952 |
| 2,640,352 | Ellison | June 2, 1953 |